(12) United States Patent
Kokkinen et al.

(10) Patent No.: US 7,519,740 B2
(45) Date of Patent: Apr. 14, 2009

(54) SERVER

(75) Inventors: Heikki Kokkinen, Tokyo (JP); Shintaro Uno, Tokyo (JP)

(73) Assignee: Nokia Siemens Networks Oy, Espoo (FI)

( * ) Notice: Subject to any disclaimer, the term of this patent is extended or adjusted under 35 U.S.C. 154(b) by 703 days.

(21) Appl. No.: 09/988,995

(22) Filed: Nov. 21, 2001

(65) Prior Publication Data

US 2002/0073240 A1 Jun. 13, 2002

(30) Foreign Application Priority Data

Nov. 27, 2000 (GB) .................................. 0028812.6

(51) Int. Cl.
*G06F 15/16* (2006.01)
(52) U.S. Cl. ..................... 709/250; 709/249; 709/217; 709/219
(58) Field of Classification Search ......... 709/217–219, 709/203, 249, 250, 200
See application file for complete search history.

(56) References Cited

U.S. PATENT DOCUMENTS

| | | | |
|---|---|---|---|
| 5,384,824 A | 1/1995 | Alvesalo | |
| 5,671,436 A | 9/1997 | Morris et al. | 395/800 |
| 5,703,929 A * | 12/1997 | Schillaci et al. | 379/21 |
| 5,732,074 A * | 3/1998 | Spaur et al. | 370/313 |
| 5,953,319 A * | 9/1999 | Dutta et al. | 370/238 |
| 6,003,068 A | 12/1999 | Sopko | 709/205 |
| 6,038,595 A | 3/2000 | Ortony | 709/218 |
| 6,138,158 A * | 10/2000 | Boyle et al. | 709/225 |
| 6,233,577 B1 * | 5/2001 | Ramasubramani et al. | 707/9 |
| 6,247,048 B1 * | 6/2001 | Greer et al. | 709/219 |
| 6,314,108 B1 * | 11/2001 | Ramasubramani et al. | 370/465 |
| 6,477,152 B1 * | 11/2002 | Hiett | 370/316 |
| 6,542,491 B1 * | 4/2003 | Tari et al. | 370/338 |
| 6,665,711 B1 * | 12/2003 | Boyle et al. | 709/219 |
| 6,738,808 B1 * | 5/2004 | Zellner et al. | 709/223 |
| 6,741,841 B1 * | 5/2004 | Mitchell | 455/188.1 |
| 6,754,183 B1 * | 6/2004 | Razavi et al. | 370/254 |
| 6,757,262 B1 * | 6/2004 | Weisshaar et al. | 370/310 |
| 6,757,712 B1 * | 6/2004 | Bastian et al. | 709/206 |

(Continued)

FOREIGN PATENT DOCUMENTS

EP 0 853 413 A2 7/1998

(Continued)

OTHER PUBLICATIONS

M. Albrecht, et al "IP Services over Bluetooth: Leading the way to a new Mobility", Local Computer Networks, 1999, LCN '99 Conference on Lowell, MA, USA Oct. 18-20, 1999, IEEE Comput. Soc., US, pp. 2-11.

(Continued)

*Primary Examiner*—Saleh Najjar
*Assistant Examiner*—Faruk Hamza
(74) *Attorney, Agent, or Firm*—Squire, Sanders & Dempsey L.L.P.

(57) ABSTRACT

A server suitable for a vehicle having a first wireless interface providing a connection on a customer basis for local user terminals to the server, to enable access to local content on the server, and a second wireless interface providing a connection to an external mobile network, to enable access to remote content on remote servers.

18 Claims, 3 Drawing Sheets

U.S. PATENT DOCUMENTS

| | | | |
|---|---|---|---|
| 6,795,408 B1 * | 9/2004 | Hiett | 370/323 |
| 6,801,934 B1 * | 10/2004 | Eranko | 709/217 |
| 6,839,770 B1 * | 1/2005 | Dillon | 709/245 |
| 7,028,304 B1 * | 4/2006 | Weinberger et al. | 719/310 |

FOREIGN PATENT DOCUMENTS

| | | |
|---|---|---|
| EP | 0 936 829 A2 | 8/1999 |
| EP | 936829 | 8/1999 |
| EP | 0 971 525 A1 | 1/2000 |
| EP | 1 039 721 A1 | 9/2000 |
| EP | 1039721 | 9/2000 |
| GB | 2 347 586 | 9/2000 |
| GB | 2347586 | 9/2000 |
| JP | 05-300070 | 11/1993 |
| JP | 11-027205 | 1/1999 |
| WO | 00/14987 | 3/2000 |
| WO | 0014987 | 3/2000 |
| WO | 01/39460 A2 | 5/2001 |

OTHER PUBLICATIONS

Fenton, et al, "Wireless Access" BT Technology Journal, BT Laboratories, GB, vol. 18, No. 3, Jul. 2000, pp. 74-86.

Lind et al, The Network Vehicle- A Glimpse into the Future of Mobile Multi-media, IEEE Aerospace and Electronic Systems Magazine, IEEE Inc. New York, vol. 14, No. 9, Sep. 1999, pp. 27-32.

Miyatsu, "Bluetooth Design Background and its Technological Features", IEICE Transactions on Fundamentals of Electronics, Communications and Computer Sciences, Institute of Electronics Information and Comm. Eng. Tokyo, JP. vol. E83-A, No. 11, pp. 2048-2053.

Gu, et al "UAV Aided Intelligent Routing for AD-HOC Wireless Network in Single-area theater", 2000 IEEE Wireless Communications and Networking Conference, Conference Record, Proceedings of IEEE Conference on Wireless Communications and Networking, Sep. 2000, pp. 1220-1225.

Yuh-Shyan et al, "MESH: Multi-eye Spiral Hopping Routing Protocol in a Wireless AD HOC Network", Proceedings Ninth International Conference on Computer Communications and Networks, Oct. 2000, pp. 657-661.

Kokkinen, et al.; "Commuting Communication".

Lind, et al.; "The Network Vehicle- A Glimpse into the Future of Mobile Multi-Media"; IEEE AES Systems Magazine; Sep. 1999; pp. 27-32.

Lind, et al.; "The Network Vehicle- A Glimpse into the Future of Mobile Multi-Media".

European Search Report.

M Albrecht, et al, "IP Services over Bluetooth: Leading the way to a new mobility", Local Computer Networks, 1999, LCN '99, Conference on Lowell, MA, USA Oct. 18-20, 1999, Los Alamitos, CA, IEEE Computer Soc., pp. 2-11.

C. Fenton, et al "Wireless Access" BT Technology Journal, BT Laboratories, vol. 18, No. Jul. 2000, pp. 74-86.

R. Lind, et al, "The Network Vehicle-A Glimpse into the Future of Mobile Multi-media" IEEE Aerospace and Electronic Systems Magazine, IEEE Inc., New York, US. vol. 14, No. 9, Sep. 1999, pp. 27-32.

Miyatsu, et al, "Bluetooth Design Background and its Technological Features" IEICE Transactions on Fundametals of Electronics, Communications and Computer Sciences, Institute of Electronics Information and Comm. Eng. Tokyo, Japan, vol. E83-A, No. 11, Nov. 2000, pp. 2048-2053.

* cited by examiner

SERVER

BACKGROUND OF THE INVENTION

1. Field of the Invention

The present invention relates generally to a server, especially, but not exclusively, an internet server, for a vehicle.

2. Description of the Prior Art

In modern urban life, especially around a major metropolis, people spend a lot of time every day commuting. Currently, people use this time, for example, by reading news, books, comics, listening to music or playing electronic games.

EP-A-936829 discloses a base station located on a train which provides cellular network access for the cellular telephones of the passengers.

'The Network Vehicle—A Glimpse Into The Future Of Mobile Multi-Media' an article by Delphi Delco Electronics Systems and IBM corporation published in IEEE 0-7803-5086-3/98 discloses a car providing internet access to its passengers.

SUMMARY OF THE INVENTION

The present invention is generally concerned with providing the commuter via a user terminal not only with the above type of service, which helps the commuting time pass more pleasantly, but also other additional types of service and internet access.

According to a first aspect of the invention, there is provided a server suitable for a vehicle having a first wireless interface providing a connection on a customer basis for local user terminals to the server, to enable access to local content on the server, and a second wireless interface providing a connection to an external mobile network, to enable access to remote content on remote servers.

Thus, the server of the present invention provides the customer with ready access to the local content via the first wireless interface and, should the customer require access to content not available locally, access to remote servers via the second wireless interface. Thus, it will be appreciated that if the services and information available locally are extensive, whereby the customer does not need to access remote servers, a very speedy service can be provided to the customer.

In this context 'on a customer basis' means that the communication between the server and the user terminal shares at least one of the following characteristics associated with a customer transaction: authentication, encryption and customer billing capability. Authentication is necessary for properly establishing the identity of the customer, thereby preventing fraud. Encryption is also necessary to prevent fraud and to protect the privacy of the customer. Customer billing facilities are needed when a customer makes use of services which are not free.

The second wireless interface in providing mobile access to the server, compromises the speed of the connection for the sake of mobility. However, there may be occasions when the vehicle in which the server is installed is stationary in a so-called 'hot-spot' area where high speed access to an external network is available. To this end, in a preferred embodiment, the server also includes a third wireless interface providing a high speed, broadband connection to an external network. Thus, when the server detects that it is in a hot-spot area, the third wireless interface can be used for external network access in preference to the second wireless interface. In other embodiments, the server can use both the second and third interfaces simultaneously. The balancing of the relative utilization of the second and third interfaces can made on the basis of overall system throughput. Additionally, in a hot-spot area, the server can update the local content via the third wireless interface.

In a preferred form, the server of the present invention may be embodied as a standard, off-the-shelf laptop computer programmed to operate as a world wide web (WWW) server, and further including wireless network adapters, such as PCMCIA cards, providing the hardware and software functionality of the first, second and third interfaces. In other embodiments, the server of the present invention may be embodied by dedicated hardware and software.

According to a second aspect of the invention, there is provided a method of carrying out commercial activity using a server, which is installed in a vehicle, having a first wireless interface providing a connection to local customer terminals and a second wireless interface providing a connection to an external mobile network, the method comprising providing content located locally in the server and content located in a remote server and accessed by the second wireless interface, wherein the local and remote content are accessible by a local customer's terminal via the first wireless interface.

The method according to the second aspect of the present invention provides an advantageous way of doing business for the service provider in that a ready-made set of customers, that is the passengers on the vehicle, who often have nothing better to do that access the content on the server.

In one embodiment, the method may further include the step of restricting access by the local customer's terminal to content on remote servers. In this way, the service provider has additional influence over the extent to which remote content on remote server may be accessed.

In one embodiment, the method may include the step of updating the local content via a third wireless interface capable of making a broadband connection with an external network. In this way, the need to physically visit the vehicle where the server is housed, for example, to install an updated CD-ROM, is avoided.

According to a third aspect of the invention, there is provided a system for providing content, comprising a service controller server connected to the internet; a local server, mounted in a vehicle, and user terminals, wherein the user terminals and the local server communicate on a customer basis over a first communication protocol, and the server and the service controller server communicate over a second cellular-system, communication protocol, whereby the user terminals can access the local server, and by its internet connection, remote servers.

In the context of the present invention, 'content' is to be understood as covering both information per se, for example, advertisements, and services.

BRIEF DESCRIPTION OF THE DRAWINGS

Exemplary embodiments of the invention are hereinafter with reference to the accompanying drawings, in which.

DETAILED DESCRIPTION OF THE INVENTION

Figure 1:
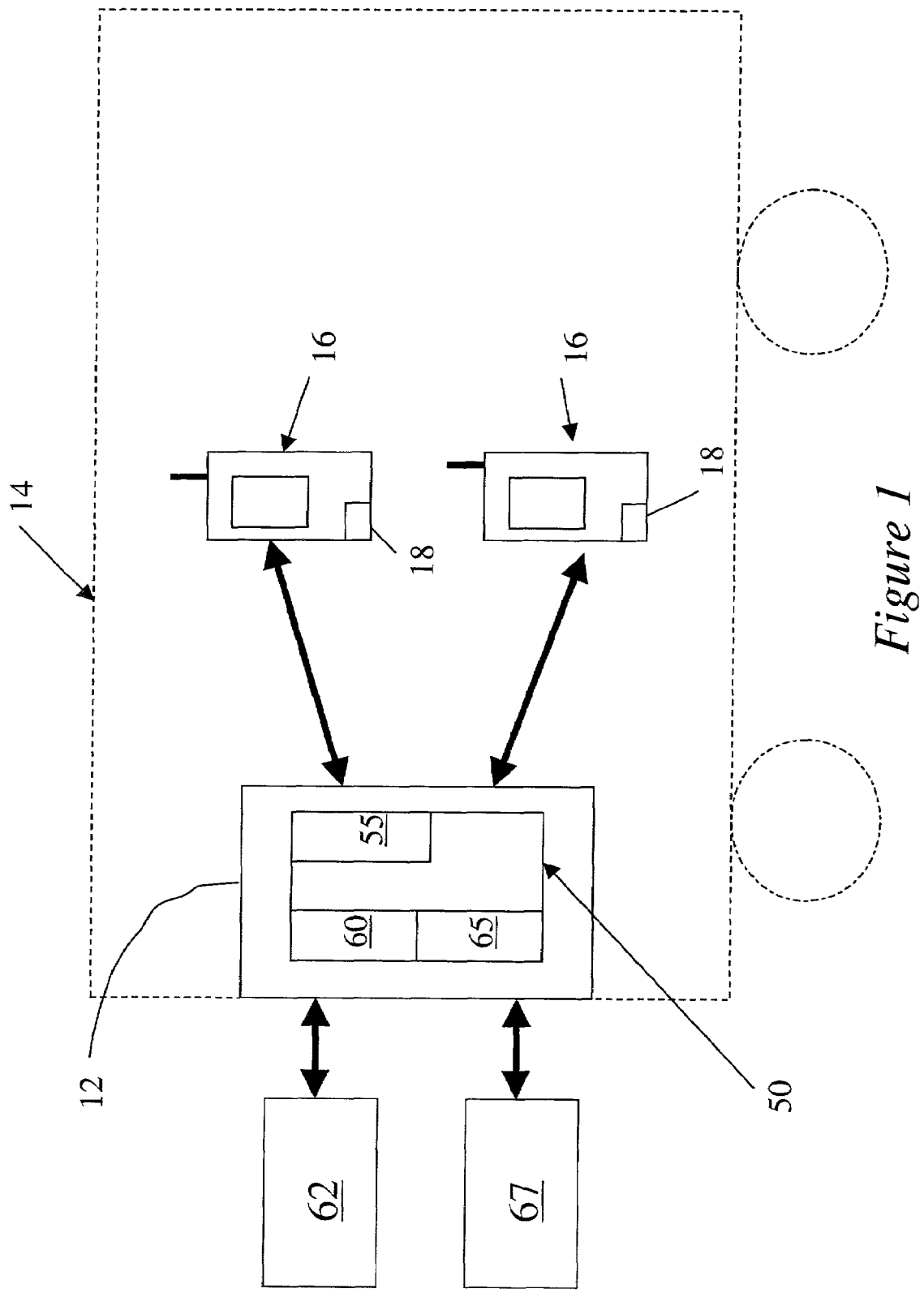
FIG. 1 shows an embodiment of the server of the present invention installed in a carriage of a train.

Referring to FIG. 1, a server 50 in accordance with the present invention is shown installed in a protective wall cabinet 12 on board a carriage 14 of a public-transport train, which is shown in dotted lines. The server is installed in this way to avoid tampering and accidental damage. Within the carriage 14, there are a number of passengers (not shown), two of which have cellular telephones 16 equipped with a Bluetooth interface 18, and internet browsing software.

Figure 2:
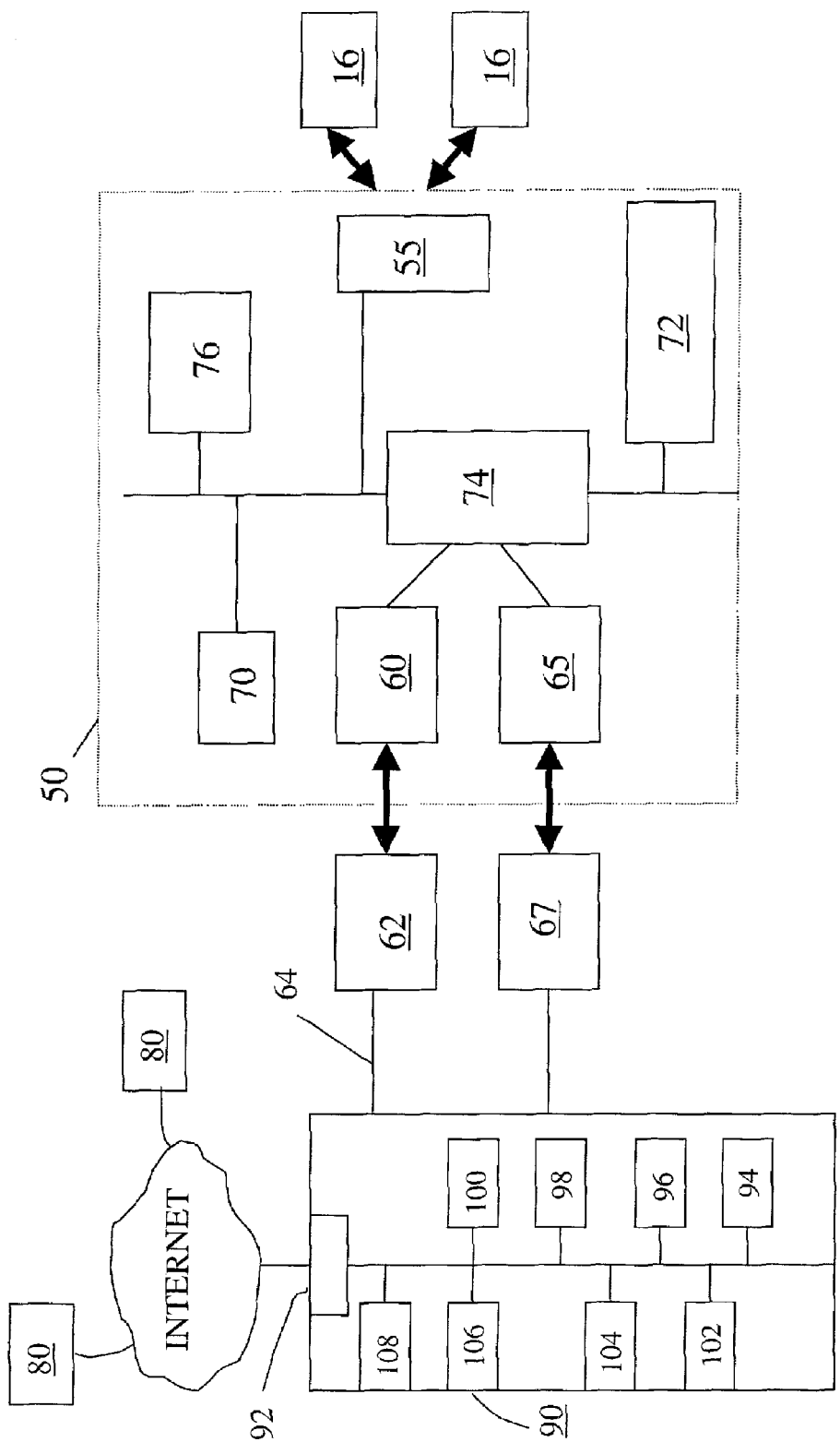
FIG. 2 shows a functional block diagram of the server of FIG. 1.

The server 50 is an off-the-shelf laptop PC programmed with software to operate as a WWW-server, which is described in more detail hereinafter, and provided with three wireless interfaces implemented by three PCMCIA cards. The first interface 55 is a Bluetooth interface which provides a broadband connection to the passengers' cellular telephones. The second interface 60 is a WCDMA interface providing a connection to an external, public, mobile WCDMA network 62. The third interface 65 is a Hiperlan Wireless LAN interface providing a broadband connection to an external network 67, when broadband access is possible in hot-spot areas such as at major train stations. The external network 67 is part of a private network installed by the public-transport company. As shown in FIG. 2, via either the second interface 60, or the third interface 65, the server 50 is given access to a service controller server 90. In the case of the WCDMA network 62, the connection between the WCDMA network and the service controller server 90 is achieved via an ISDN connection 64. The service control server 90 is connected to the internet via a single gateway 92 including a firewall.

The software in the service controller server 90 includes a number of functional modules. A DHCP (domain home control protocol) module 94 assigns an individual address to the server 50. A NAT (network address translator) module 96 locally-expands the number of IP addresses recognized within the company's network. An SMTP relay module 98 forwards emails. A mirror site module 108, includes a Rsync program, CVSup program, and a proxy module ProxyPass directive, for duplicating a database of information at a remote site. A SNMP (simple network management protocol) is module 102. A SSL (secure socket layer) is module 104. A local content source is module 106. A remote network management protocol and useage monitoring is module 108.

The software in the server 50 includes a number of functional modules 70,72,74, and 76. An encryption, authentication and billing module 70 handles the commercial aspects of the transactions with passengers' terminals. Web authentication 70 is necessary for properly establishing the identity of the customer, thereby preventing fraud. Encryption is also necessary to prevent fraud and to protect the privacy of the customer. Customer billing facilities are needed when a customer makes use of services which are not free. A local content module 72 provides an extensive body of local content including services and information for the passengers' to access. Examples include news, cartoons, music, video, timetables, games, electronic commerce, and advertisements. Some of the content is free and for other content a fee is levied. An access control module 74 controls and balances access to the external network by the second and third interfaces 60 and 65. The module 74 also operates to restrict free access to the whole internet at the discretion of the server operator. An update module 76 enables the server software, including the content, to be updated when broadband access in hot-spot areas is possible.

In use, when a passenger boards the carriage 14 for the daily journey to or from the workplace, the passenger can pass time or engage in some more fruitful activity by logging on to the server 50 via the Bluetooth connection between the first interface 55 of the server 50 and that of the cellular telephone. The module 70 ensures the integrity of the connection by providing authentication and encryption. Once the user is authenticated locally, this information is passed to the service controller server 90 via the WCDMA network 62 and then the ISDN line 64, where the DHCP protocol module assigns an individual IP address to the user. Because there may be more user terminals at one time than there are IP addresses allocated to the transport company's network, the NAT 96 is also needed. If the passenger wants to make use of the non-free content, then the module 70 also takes care of registering the passenger for billing purposes and running the billing process. For the local content 72, the passenger enjoys a very speedy service because of the high data rates which the Bluetooth connection can support.

If the passenger attempts to access a remote server, this request is passed to the access control module 74. The access control module 74 is responsible for determining whether to permit access to the requested sever. The access control module 74 provides an IP address filtering function and may also contain a black-list of specific internet addresses for which it denies access to an access request from a passenger. If the module 74 determines that access is permitted, it also determines by which of the second and third interfaces 60, 65 external network access is to be achieved. The access control module 74 determines which interface to use by first instructing the third interface 65 to attempt to make a connection with an external network 67.

In the normal case when the train is not in a hot-spot, such as for example, when the train is moving between stations or stationary in a minor station which is not equipped with a broadband access point to an external network, the third interface 65 fails to make a connection, whereby in default, the access control module 74 makes a mobile connection to the WCDMA network 62 via the second interface 60. Through this connection, access to the service controller server 90 is achieved, through the gateway 92 of which access to the internet and finally the remote servers 80 can be achieved.

In the less frequent case where the train is in a hot-spot area, for example, stationary in a train station where a broadband access point to an external network is available, then the attempt by the third interface to make a connection with the external network 67 is successful and the access control module 74 makes use of the third interface 65. Through this connection. access to the service controller server 90 is achieved, through the gateway of which access to the internet and finally the remote content on remote servers 90 is accomplished. From a passenger's perspective, the speed of access to remote servers compares favorably with that via the second interface 60 because the downlink connection between the network 67 and the third interface does not act as a data bottleneck. It will be appreciated that it is a significant advantage of this embodiment of the advantage that internet access is maintained at all times (within the coverage of the WCDMA network).

In a hot-spot area, the update module 76 can take advantage of the broadband connection with the external network 67 and download updates in the content provided locally, for example, the latest news or other information updates, or additional/replacement services to be offered as local content, an updated list of black-listed internet addresses or additional software for the server to run. The downloading is handled in the service controller module 108 by the mirror site module 108 which brings the local server into line with the local content source module database in the service controller module. The request for updating can be made by either server 50 or the server 90.

In other embodiments, instead of a cellular telephone, other types of user terminal such as a wearable computer, multimedia terminal, PDA, communicator, wristwatch or a laptop fitted with a wireless network adapter may be used.

In other embodiments, instead of a GSM interface, the first interface 55 can be PDC, PHS, EDGE, GPRS, WCDMA, IMT-2000, CDMAOne, ICO Iridium or GoldStar interface.

In other embodiments, instead of a Bluetooth interface, the second interface 60 can be a Hiperlan Wireless LAN, IEEE 802.11 Wireless LAN, MMAC Wireless LAN, Wireless IEEE 1394, Home RF or IRDA interface.

In other embodiments, instead of a Hiperlan Wireless LAN interface, the third interface 65 can be an IEEE 802.11, MMAC Wireless LAN, Bluetooth IEEE 802.16, IEEE 802.15, ETSI Hiperaccess, ARIB T-58 or ARIB T-59 interface. The external network 67 may also be part of a public network.

The server can be installed in other vehicles such as a bus, metro, tram, taxi, private car, aircraft, ferry or boat.

In other embodiments of the invention, functionality can be shifted between the service controller server 90 and the server 50 according to practical system requirements. For example, the IP address filtering function of the access control module 74 can be resident in the service controller server 90 instead of the server 50 as described above. Likewise, the client billing functionality can also be shifted to the service controller server 90.

From the server provider's/service provider's point of view, the above-illustrated embodiment is an advantageous way of carrying out e-commerce. Importantly, the service provider has a ready-made set of customers, that is the passengers, with nothing much to do except access the content available from the server 50. In addition, the content which is local to the server 50 by virtue of its ready accessibility as compared to with that available from a remote server 90, if for no other reason than speed of access, is likely to be highly preferred by the passengers, and so with no costs to be incurred for mobile network connections and with reasonable pricing of the local content, long-lasting use of the services will be encouraged. If slow access alone proves to be insufficient disincentive to access certain remote servers 90, then the access control module 74 can prevent access to certain remote servers. These factors combine to give the service provider unprecedented influence over the range of content a customer can access. Further, the service provider has the opportunity to charge third party companies for storing content locally. The above-illustrated embodiment makes extensive good use of the public cellular architecture to maintain a mobile connection via the second interface 65.

Also, the updating module 76 of the server enables the service provider to keep the content stored locally on the server up-to-date with minimum bother, the updating of the local content taking place via the third interface 65, thereby avoiding the need to physically visit the server, for example, to install an updated CD-ROM.

Because of these favorable circumstances, the internet portal initially presented by the server 50 to the passengers would become very familiar, whereby the portal could be made into a valuable brand. A premium can be charged by the service provider for links to content residing locally on the server 50, as compared with links to content on remote servers 70.

Figure 3:
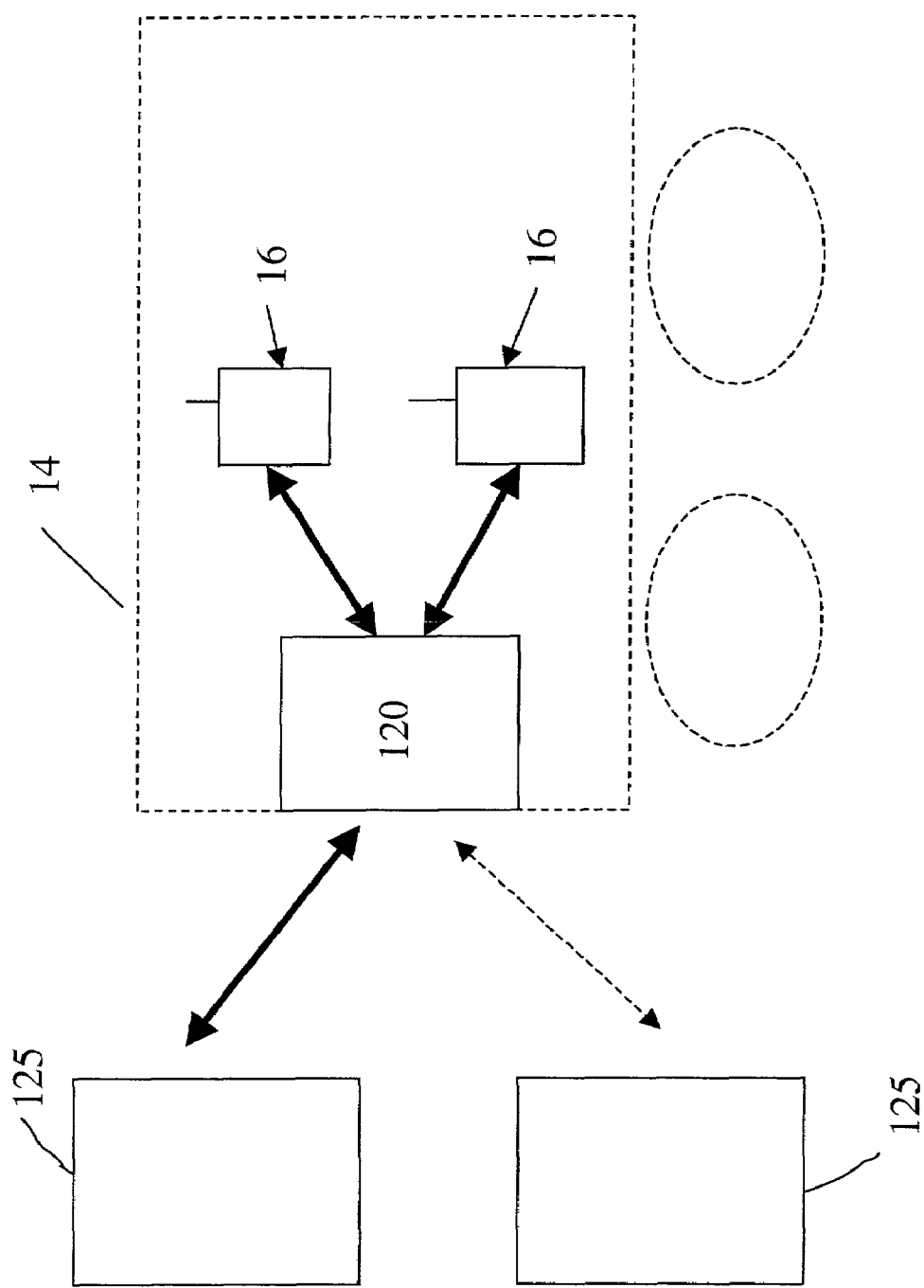
FIG. 3 shows another embodiment of the invention installed in a carriage of a train.

FIG. 3 represent a different way of implementing the present invention. In this drawing, similar parts have been given the same number. The server 120 is similar to the server 50 in the FIG. 1 embodiment. It differs in that the second interface which provides connection to a network external of the carriage is not a link providing mobility, like a cellular system link, but can be any other kind of RF connection, for instance, any of the WLAN standards previously mentioned.

Also, the server is provided with mesh and/or ad-hoc routing protocols. The effect of this is that each carriage in the train behaves as the node of mesh and/or adhoc network, whereby if a server cannot, for a time, communicate with a part of the core network 125, the network routing paths are reconfigured such that the traffic which it wishes to transmit is routed over the air to another server in another carriage which is able to currently access the core network. Otherwise, this embodiment has all the functionality and advantages of the previously described embodiment.

What is claimed is:

1. A server for use in a vehicle including a first wireless interface providing a connection on a customer basis, for local user terminals to the server, to enable access to local content on the server, a second wireless interface providing a connection to an external mobile network, to enable access to remote content on remote servers, and a third wireless interface for providing a broadband connection to an external network to enable access to remote content on remote servers, wherein if access to a remote server is requested by a local user terminal, the server first attempts to connect to the remote server via the third wireless interface such that if the third wireless interface establishes a connection with the remote server, the local user terminal is permitted to access the remote content using the server via the third wireless interface, and if the third wireless interface cannot establish a connection with the remote server, the server attempts to connect to the remote server via the second wireless interface so that the local customer terminal can use the server to access the remote content via the second wireless interface.

2. A server as in claim 1, comprising detection means for determining a presence of an external network capable of making a broadband connection with the third wireless interface.

3. A server as in claim 2, comprising access control means, responsive to the detection means, for determining utilization of the second and third wireless interfaces.

4. A server as in claim 3, comprising content update means for updating the local content on the server via the third wireless interface.

5. A server as claimed in claim 1 comprising a computer programmed to operate as a world wide web server and including first and second network data adapters providing the first and second wireless interfaces, respectively.

6. A server as claimed in claim 5, wherein a third network data adapter provides the third wireless interface.

7. The server of claim 1, wherein the first wireless interface comprises a Bluetooth interface.

8. The server of claim 1, wherein the second wireless interface comprises a WCDMA interface.

9. The server of claim 1, wherein the third wireless interface comprises a Hiperlan Wireless LAN interface.

10. A method of providing content using a server, which is installed in a vehicle, including a first wireless interface providing a connection to local customer terminals and a second and third wireless interfaces providing a connection to an external mobile network, comprising:

receiving a request via the first wireless interface from a local customer terminal to access a remote server;

using the server to attempt to establish a connection with the remote server via the third wireless interface;

if the third wireless interface establishes a connection with the remote server, permitting the local customer terminal to access remote content on the remote server using the server via the third wireless interface; and if the third wireless interface is unable to establish a connection with the remote server, using the server to attempt to establish a connection with the remote server via the second wireless interface so that the local customer terminal can use the server to access the remote content via the second wireless interface.

11. The method of claim 10, further comprising providing content located locally in the server and content located in the remote server and accessed by the second wireless interface, updating the local content via the third wireless interface capable of making a broadband connection with an external network, wherein the local and remote content are accessible by local customer terminals via the first wireless interface.

12. A method as claimed in claim 11, comprising restricting access by the local customer's terminal to content on remote servers.

13. A method as claimed in claim 10, generating revenue by charging third party companies for storing content locally.

14. A method as claimed in claim 13, wherein the server provides an internet portal to the customers, wherein the method comprises charging a premium to third party companies for links to content stored locally, compared to charges, if any, for links to content stored remotely.

15. The method of claim 10, wherein the third wireless interface comprises a broadband interface.

16. The method of claim 10, wherein the third wireless interface comprises a Hiperlan Wireless LAN interface.

17. The method of claim 10, wherein the first wireless interface comprises a Bluetooth interface.

18. The method of claim 10, wherein the second wireless interface comprises a WCDMA interface.

* * * * *